(12) United States Patent
Ligabue et al.

(10) Patent No.: US 11,522,248 B2
(45) Date of Patent: Dec. 6, 2022

(54) POWER STORAGE SYSTEM FOR AN ELECTRIC DRIVE VEHICLE

(71) Applicant: FERRARI S.p.A., Modena (IT)

(72) Inventors: Elena Ligabue, Serramazzoni (IT); Enrico Venturi, Modena (IT); Luca Poggio, Casalecchio di Reno (IT)

(73) Assignee: FERRARI S.P.A., Modena (IT)

( * ) Notice: Subject to any disclaimer, the term of this patent is extended or adjusted under 35 U.S.C. 154(b) by 104 days.

(21) Appl. No.: 16/942,185

(22) Filed: Jul. 29, 2020

(65) Prior Publication Data

US 2021/0036281 A1    Feb. 4, 2021

(30) Foreign Application Priority Data

Jul. 31, 2019  (IT) .................. 102019000013545

(51) Int. Cl.
*H01M 50/24*   (2021.01)
*H01M 10/613*  (2014.01)
(Continued)

(52) U.S. Cl.
CPC ............. *H01M 50/24* (2021.01); *B60K 11/00* (2013.01); *B60L 50/64* (2019.02);
(Continued)

(58) Field of Classification Search
CPC ............. H01M 10/613; H01M 10/625; H01M 10/6556; H01M 10/0525; H01M 10/6568; H01M 10/658; H01M 50/24; H01M 50/20; H01M 2220/20; H01M 2200/00; H01M 50/238; A62C 3/16; B60K 11/00; B60L 50/64; B60L 3/0046; B60L 3/0092; B60L 53/16; B60R 16/0231; B60R 16/03; B60R 16/08; B60Y 2200/91; Y02E 60/10; Y02T 10/70; Y02T 10/7072; Y02T 90/14
See application file for complete search history.

(56) References Cited

U.S. PATENT DOCUMENTS 3,527,925 A    9/1970   Toyooka et al.
5,293,951 A *  3/1994   Scott ................ H01M 50/20
                                                180/68.5
(Continued)

FOREIGN PATENT DOCUMENTS

GB    2213981       * 12/1987   ............. H01M 2/02
GB    2213981 A       8/1989

OTHER PUBLICATIONS

Search Report issued in Italian Patent Application No. 201900013545, completed Apr. 16, 2020; 9 pages.

*Primary Examiner* — Kiran Quraishi Akhtar
(74) *Attorney, Agent, or Firm* — Cantor Colburn LLP

(57) ABSTRACT

A power storage system for an electric drive vehicle; the power storage system comprises: at least one battery pack, which is provided with a plurality of electrochemical cells, which are electrically connected to one another; a container, which is provided, on the inside, with a chamber housing the battery pack; at least one first connector, which is mounted on the container; and a covering casing, which is designed to thermally insulate and protect the casing from fire. The covering casing is made of a fireproof fabric, which is also thermally insulating and is in direct contact with an outer surface of the container.

8 Claims, 6 Drawing Sheets

(51) Int. Cl.
*H01M 10/625* (2014.01)
*H01M 10/6556* (2014.01)
*B60L 50/64* (2019.01)
*H01M 50/20* (2021.01)
*B60K 11/00* (2006.01)
*B60R 16/023* (2006.01)
*B60R 16/03* (2006.01)
*B60R 16/08* (2006.01)

(52) U.S. Cl.
CPC .......... *B60R 16/0231* (2013.01); *B60R 16/03* (2013.01); *B60R 16/08* (2013.01); *H01M 10/613* (2015.04); *H01M 10/625* (2015.04); *H01M 10/6556* (2015.04); *H01M 50/20* (2021.01); *H01M 2220/20* (2013.01)

(56) References Cited

U.S. PATENT DOCUMENTS

| | | | |
|---|---|---|---|
| 6,494,279 B1* | 12/2002 | Hutchens | H01M 50/20 180/68.5 |
| 2012/0138260 A1* | 6/2012 | Lee | H01M 10/6563 165/41 |
| 2018/0168065 A1 | 6/2018 | Thiel et al. | |

* cited by examiner

POWER STORAGE SYSTEM FOR AN ELECTRIC DRIVE VEHICLE

CROSS-REFERENCE TO RELATED APPLICATIONS

This patent application claims priority from Italian Patent Application No. 102019000013545 filed on Jul. 31, 2019, the entire disclosure of which is incorporated herein by reference.

TECHNICAL FIELD

The invention relates to a power storage system for an electric drive vehicle.

PRIOR ART

In detail, a power storage system of an electric drive vehicle is known, which comprises at least one battery pack, which has a plurality of electrochemical cells, which are electrically connected to one another in series and/or in parallel, an inner container, which defines a chamber housing the battery pack, and an electrical connector, which projects from the inner container so as to connect the battery pack to the drive system of the electric drive system.

Known power storage systems further comprise a covering container, which is arranged on the outside of the inner container and is designed to allow the inner container (hence, the battery pack) to be sufficiently fireproof and to thermally insulate the inner container (hence, the battery pack).

In detail, the covering container of a known power storage system is made of a metal material, typically steel or aluminium alloys, and is arranged at a given distance from the inner container, so that between the inner container and the covering container there is defined an air space, which is suited to make sure that the inner container (hence, the battery pack) is correctly thermally insulated, thus avoiding the risk that heat coming from the outside can excessively heat the battery pack, hence causing the damaging or, in the worst case scenario, the explosion of one or more electrochemical cells.

In order for the power storage system to pass the mandatory and increasingly strict fire resistance tests, which are necessary for its type approval (namely, so that the covering container is able to deliver correct values of fire resistance and thermal insulation), the covering container and the air space must have a thickness that is such that, even if the power storage system is subjected to a temperature of approximately 1200° C. with an open flame, the battery pack inside the inner container does not exceed 120° C. These performances can be ensured only by means of a covering container and an air space with a significant thickness.

However, the increase in the thickness of the covering container and of the air space causes an increase in the overall dimensions of the power storage system as well as in the weight thereof. This can be a problem in automotive applications, where weight and size reductions are more and more necessary, in particular when said power storage systems have to be installed in sports vehicles that require high performances and offer small inner spaces.

Patent application GB2213981A describes a thermally insulating covering casing for a battery of a vehicle, which protects the battery from low winter temperatures; the covering casing is flexible and can be folded so as to assume a flat conformation and, hence, be easily stored when it is not used.

DESCRIPTION OF THE INVENTION

The object of the invention is to provide a power storage system for an electric drive vehicle, said power storage system being capable of overcoming the drawbacks described above and being easy and economic to be manufactured.

According to the invention, there is provided a power storage system for an electric drive vehicle according to the accompanying claims.

The appended claims describe preferred embodiments of the invention and form an integral part of the description.

BRIEF DESCRIPTION OF THE DRAWINGS

The invention will now be described with reference to the accompanying figures, which show a non-limiting embodiment thereof, wherein.

PREFERRED EMBODIMENTS OF THE INVENTION

Figure 1:
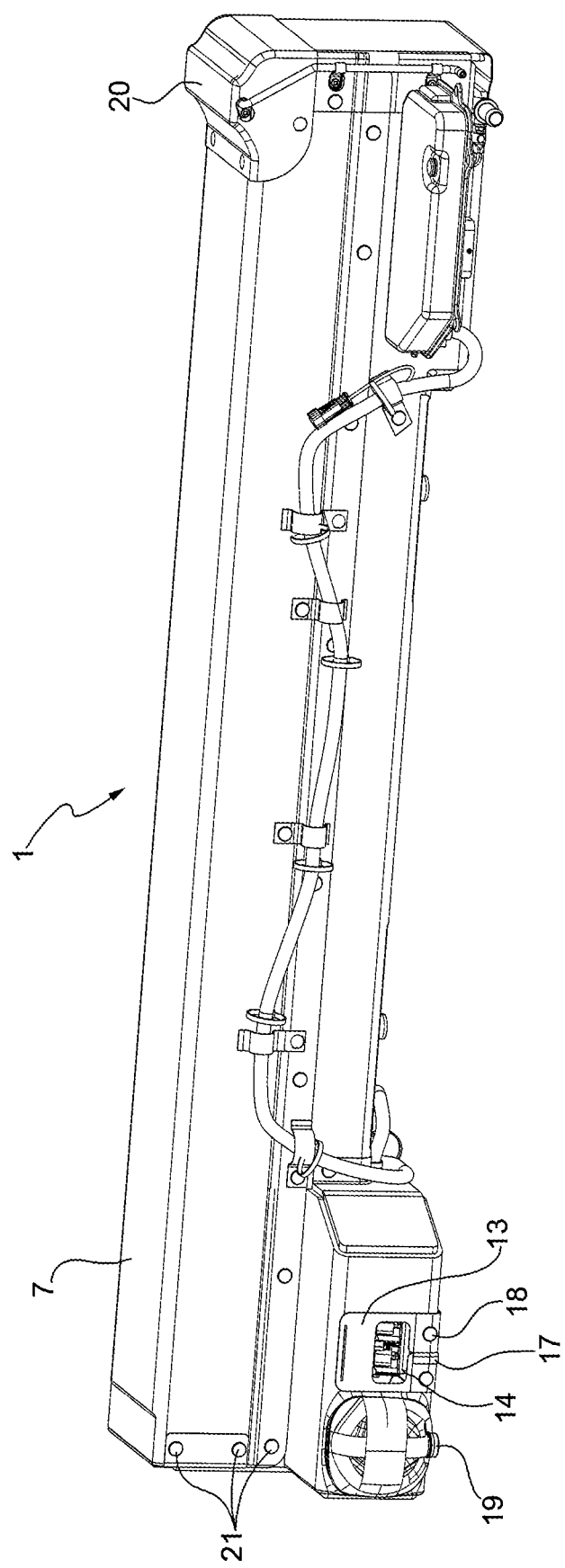
FIG. 1 shows a schematic perspective view of a power storage system for a drive system of an electric drive vehicle according to the invention.

In the accompanying figures, number 1 indicates, as a whole, a power storage system suited to be mounted on board an electric drive vehicle (which is not shown herein). In particular, the power storage system 1 is suited to be connected to a drive system (which is not shown herein) of the electric drive vehicle and is designed to store the power produced by an electric machine (which is not shown herein). The power storage system 1 is connected to the electric machine through the interposition of a power converter (commonly known as inverter), which, based on the different needs of the electric machine and of the power storage system 1, transforms the direct current outputted by the power storage system 1 into alternating current for the electric machine and vice versa.

The power storage system 1 shown in the accompanying figures comprises a battery pack 2 and a container 3 (typically made of a plastic material, which is electrically insulating), which defines, on the inside, a chamber 4 housing the battery pack 2.

In detail, the battery pack 2 comprises a plurality of electrochemical cells 5, which are electrically connected to one another in series and/or in parallel and are designed to convert the chemical energy stored into electrical energy and vice versa. The electrochemical cells 5 preferably are Li-Ion cells.

Figure 3:
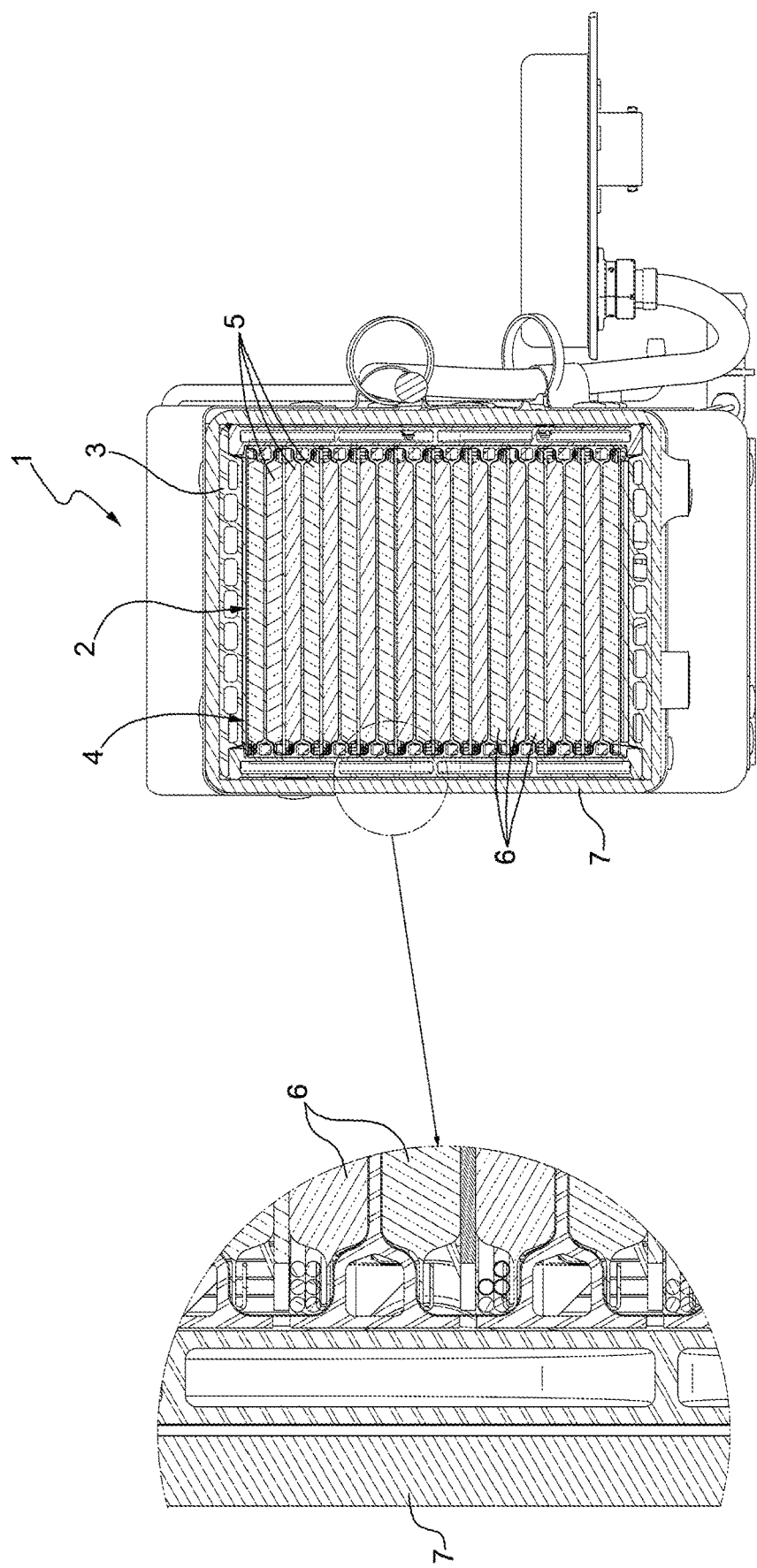
FIG. 3 shows a cross section view of the power storage system of FIG. 1.

According to a preferred, though non-binding embodiment shown in FIG. 3, each electrochemical cell 5 substantially has the shape of a parallelepiped and has, at an end, a positive pole and, at an opposite end, a negative pole.

Advantageously, though not exclusively, the electrochemical cells 5 are divided into battery modules 6, each housing a given number of electrochemical cells 5; the battery modules 6 are electrically connected to one another in series or in parallel. For instance, in the non-limiting case shown in FIG. 3, twenty battery modules 6 are provided, which are placed on top of one another so as to form the battery pack 2.

Each battery module 6 can obviously include any number of electrochemical cells 5 and the battery pack 2 can obviously include any number of battery modules 6. Furthermore, it is understood that the electrochemical cells 5 can have any shape and/or size; for example, according to embodiments which are not shown herein, the electrochemical cells 5 could have a cylindrical shape and be arranged next to one another inside the container 3.

The storage system 1 shown in the accompanying figures further comprises a covering casing 7, which is designed to thermally insulate and protect the container 3 from fire. The covering casing 7 is made of a fireproof fabric, which is also thermally insulating and is in direct contact (namely, without clearance) with an outer surface 8 of the container 3. In other words, the fabric making up the covering casing 7 is more fireproof than the (generally plastic) material making up the container 3, since the fabric making up the covering casing 7 is more resistant to combustion than the (generally plastic) material making up the container 3; furthermore, the fabric making up the covering container 7 is more thermally insulating than the (generally plastic) material making up the container 3, since the fabric making up the covering casing 7 has a smaller thermal conductivity than the (generally plastic) material making up the container 3. In particular, the fabric making up the covering casing 7 is flexible, namely it can elastically deform (i.e. without being subjected to plastic deformations) even when it is bent at 90° and more in order to cause it to assume different shapes.

In detail, the covering casing 7 reproduces the shape of the container 3 and is shaped so as to adhere to the container 3 without clearance.

Figure 4:
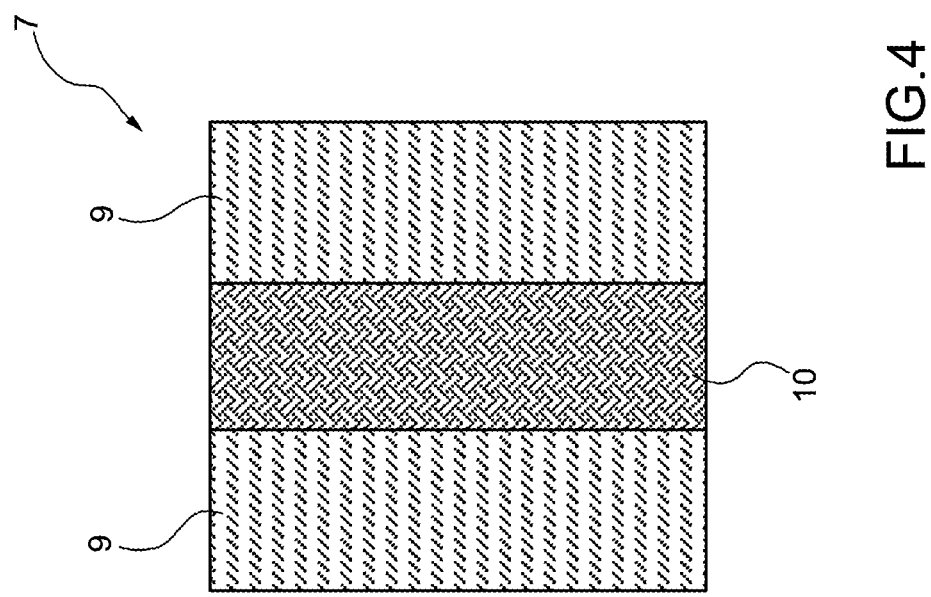
FIG. 4 is a schematic sectional view, on a larger scale, of the covering casing of the power storage system of FIG. 1.

According to the preferred, though non-limiting embodiment shown in FIG. 4, the fireproof fabric making up the covering casing 7 comprises two outer fireproof layers 9 made of nonwoven fabric (preferably reinforced with glass fibres) and an inner layer 10, which is interposed between the two outer fireproof layers 9, is made of a fibrous fabric (preferably reinforced with glass fibres) and is designed to provide a greater thermal insulation than the two outer fireproof layers 9.

Figure 2:
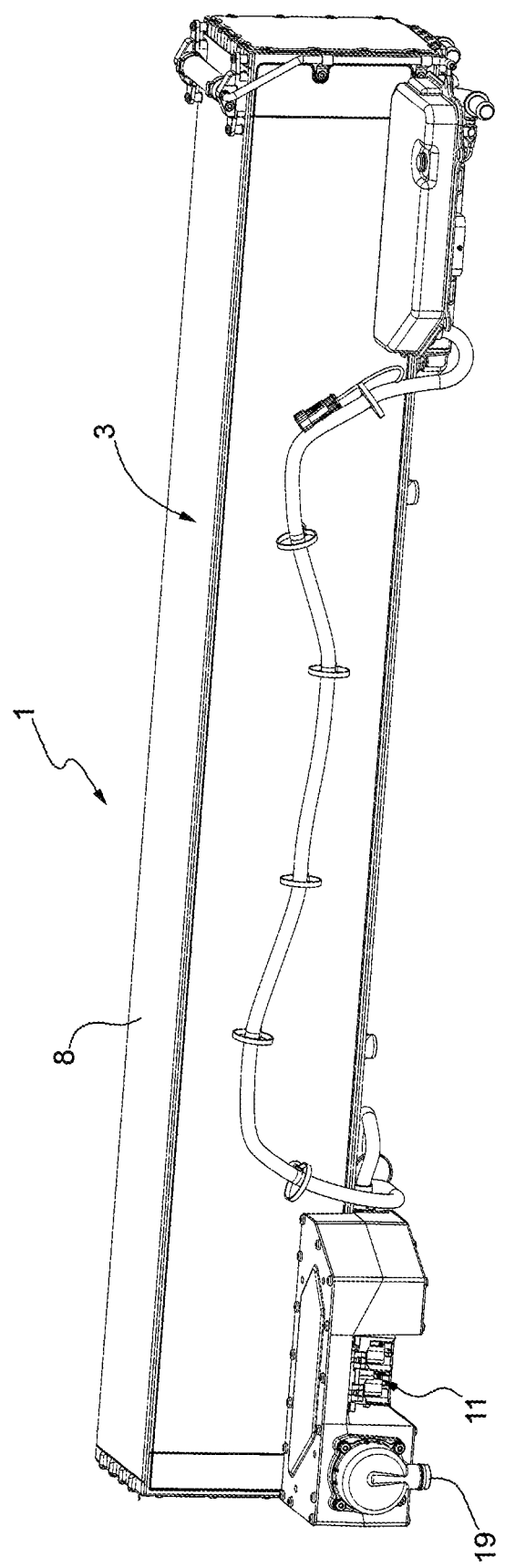
FIG. 2 shows a schematic perspective view of the power storage system of FIG. 1 with the removal of a covering casing.

According to the embodiment shown in FIGS. 1 and 2, the container 3 is provided with at least one power connector 11, which is designed to receive at least one thread-like connection element (namely, an electrical cable not shown herein), which ends with a further connector (not shown), which engages the connector 11 and is designed to connect the storage system 1 to the vehicle, namely to the drive system of the vehicle.

Figure 6:
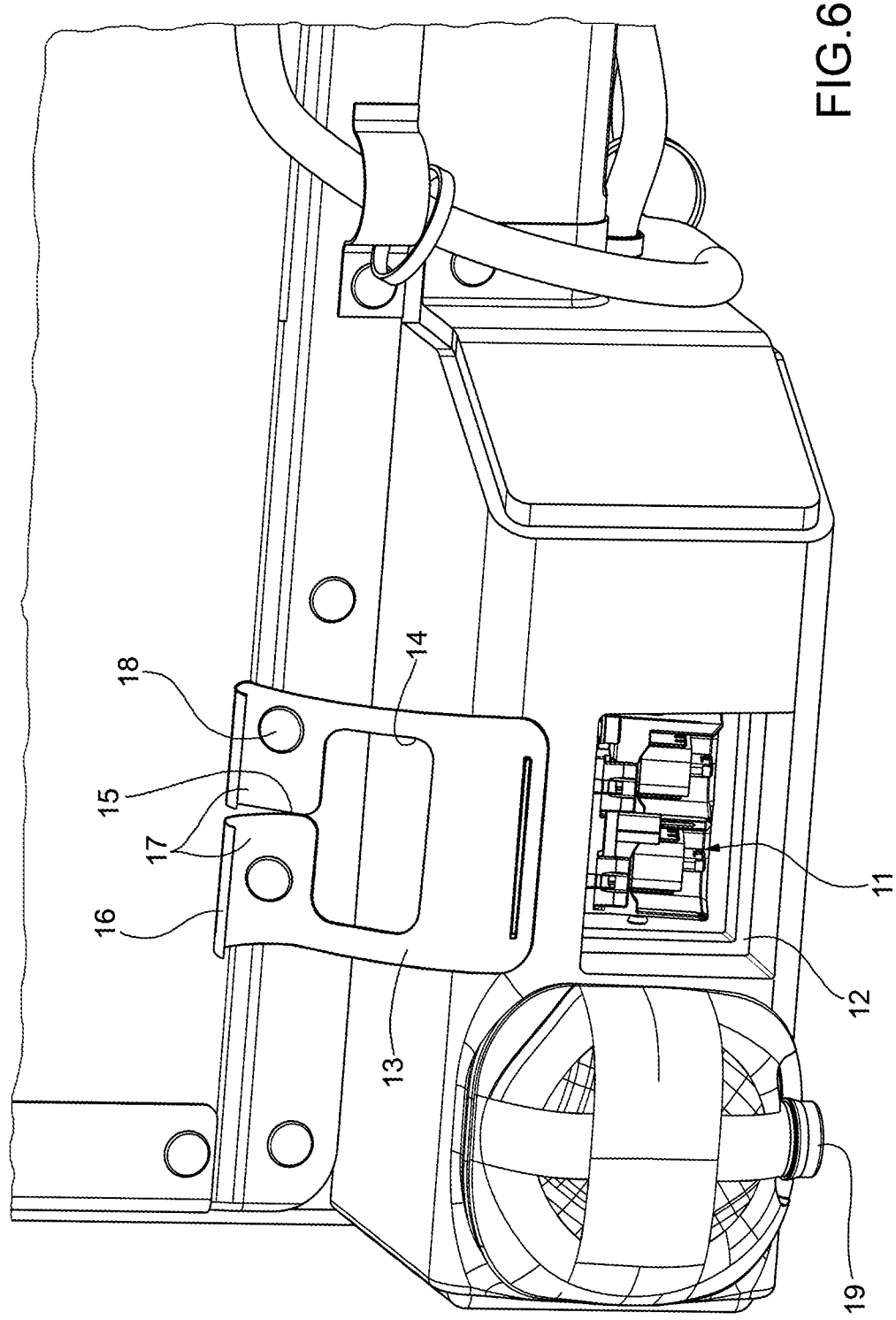

According to FIG. 6, the covering casing 7 has, in the area of the power connector 11, a through hole 12, which has an area (extension) which is equal to or greater than an area (extension) of the power connector 11, so as to allow the further connector to engage the power connector 11 and part of the further connector and/or of the thread-like connection element to come out of the covering casing 7.

In order to avoid risking that the through hole 12 excessively weakens (from a thermal point of view) the covering casing 7, thus compromising the fireproofing capacities thereof, the covering casing 7 is preferably provided with a patch 13, which is arranged in the area of the through hole 12 and is designed to at least partially close the through hole 12, allowing—at the same time—the thread-like connection element to come out of the covering casing 7.

In detail, the patch 13 is fixed to the rest of the covering casing 7 in a movable manner so that it cans move from a lifted position (shown in FIG. 6), in which the patch 13 is spaced apart from the rest of the covering casing 7 so as not to obstruct the through hole 12, and a protection position (shown in FIG. 5), in which the patch 13 rests against the rest of the covering casing 7 so as to partially close the through hole 12.

In particular, the patch 13 has, in turn, on the inside, a through hole 14, which is smaller than the through hole 12 (namely, has a smaller area than the through hole 12, can be entirely contained inside the through hole 12) and is designed, at least when the patch 13 is in the protection position, to be crossed by the thread-like connection element without clearance. In other words, when the patch 13 is in the protection position, it closes a part of the through hole 12 from which the thread-like connection element comes out, so that the thread-like connection element crosses the patch 13, thus getting into the through hole 14 and, in particular, occupying the entire through hole 14 (namely, adhering to the walls of the through hole 14).

Advantageously, the fact that the hole 14 is sized so as to be crossed by the thread-like connection element without clearance allows for a minimization of the risk that, between the thread-like connection element and the through hole 14, a space is left, which is such as to allow heat and/or flames to get in, thus ensuring better fireproofing performances of the covering casing 7.

Figure 5:
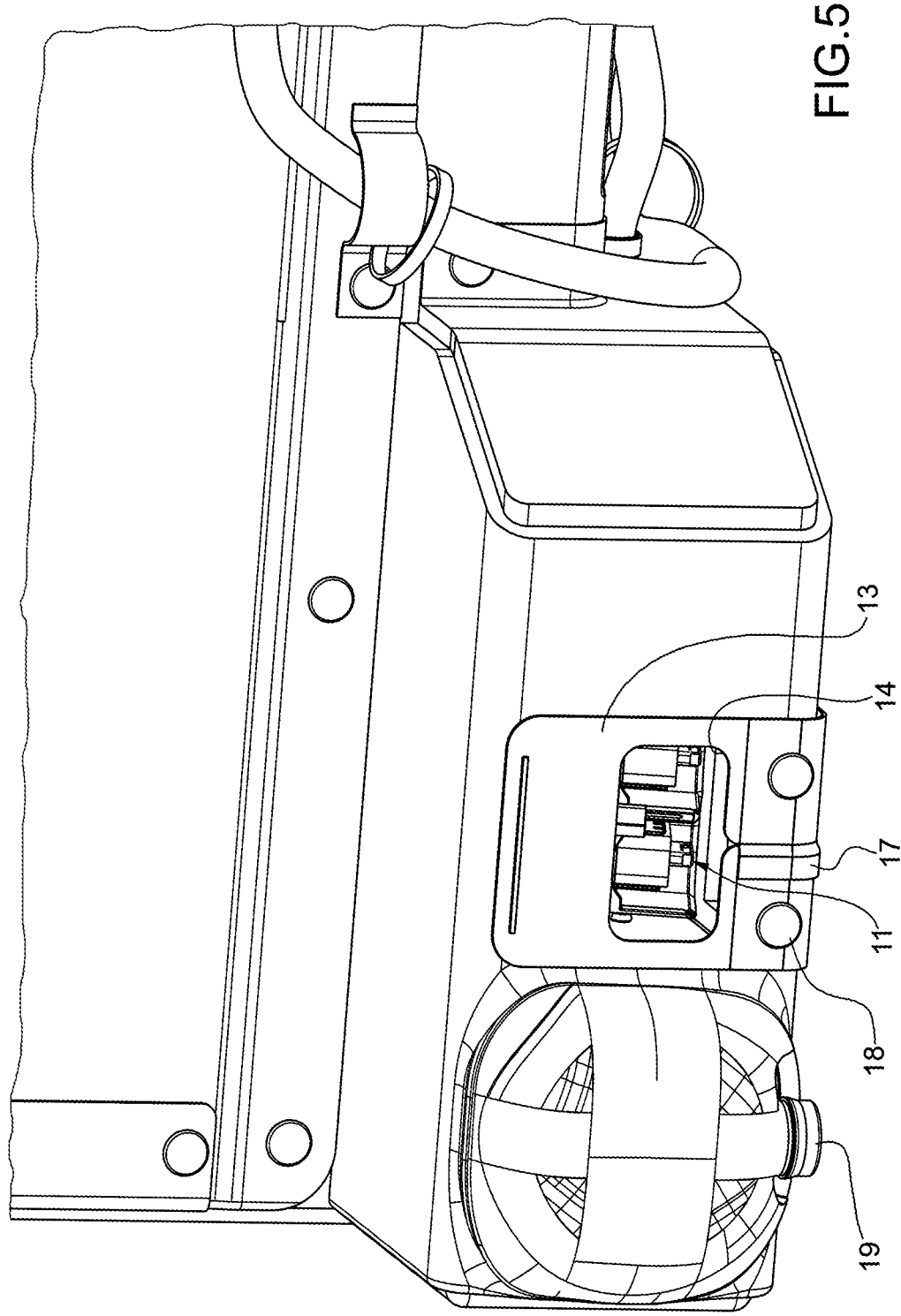
FIGS. 5 and 6 show, on a larger scale, a detail of FIG. 1 with a patch arranged in a protection position and in a lifted position, respectively.

According to the embodiment shown in FIGS. 5 and 6, the patch 13 has at least one through cut 15, which originates form the through hole 14 and reaches an outer free edge 16 of the patch 13. In particular, the patch 13 is configured so as to assume an open configuration, in which the two flaps 17 of the cut 15 are spaced apart from one another and the patch 13 is designed to be crossed by the thread-like connection element in order to place the thread-like connection element inside the through hole 14, and a closed configuration (shown in FIG. 5), in which the flaps 17 of the cut 15 partially overlap one another so as to close the cut 15 and delimit the through hole 14 ensuring that the thread-like connection element adheres to an edge of the through hole 14 without clearance.

In order to fix the patch 13 to the rest of the covering casing 7, once the patch 13 is in the protection position and takes on the closed configuration (according to FIG. 5), fixing means 18 are provided. In particular, according to a preferred embodiment, the fixing means comprise (consist of) at least one metal press stud 18, which is designed to fix at least one of the flaps 17—or both flaps 17—to the rest of the covering casing 7. In detail, the press stud 18 could be arranged in the area where the two flaps 17 overlap one another or, according to another alternative (shown in FIGS. 5 and 6), two metal press studs 18 could be provided, one on the side of each flap 17.

In the embodiment shown in the accompanying figures, the power storage system 1 comprises, besides the power connector 11, a signal connector, which is separate from and independent of the power connector 11. According to this embodiment, in the area of each electrical connector (either the power connector 11 or the signal connector), the covering casing 7 has a relative through hole 12 and a relative patch 13 covering the through hole 12.

The power storage system 1 further comprises a hydraulic connector 19, which is designed to cause a cooling fluid to circulate inside the container 3 in order to cool the storage system 1. In the area of the hydraulic connector 19, the covering casing 7 has a relative through hole 12, which is not covered by a patch 13 (since the hydraulic pipe, namely the thread-like connection element, has the shape size as its own connector, which engages the hydraulic connector 19), see for example FIGS. 1, 5 and 6.

The covering casing 7 further comprises at least a plurality of stabilization wings 20, each resting on a part the covering casing 7 and being fixed to the covering casing 7 (namely, to said part of the covering casing 7) by means of metal press studs 21.

In particular, the stabilization wings 20 are arranged in the area of the corners of the container 3 or in the area of projecting regions, for example above the hydraulic pipe surrounding the container 3.

The press studs 21 can obviously be replaced by any other fixing element with the same function.

The storage system 1 described above has numerous advantages.

First of all, the storage system 1 described above has smaller dimensions compared to known covering containers, since it comprises a covering casing 7 that adheres to the container 3 without clearance, hence without interposition of further spaces or layers.

Furthermore, since the covering casing 7 is made of fabric, the covering casing 7 has a significantly smaller weight than the weight of known covering containers having a metal layer with a remarkable thickness.

In other words, the solution suggested herein, given the same effectiveness, reduces the weight and the dimensions of the power storage system 1.

Furthermore, the storage system 1 described above can easily be mounted on and/or removed from the container 3 by simply placing an end portion of the covering casing 7 on top of another end portion and fixing them to one another, preferably by means of press studs 21 (see FIG. 1).

Finally, the storage system 1 described above is simple and economic to be manufactured.

LIST OF THE REFERENCE NUMBERS OF THE FIGURES 1 power storage system
2 battery pack
3 container
4 chamber
5 electrochemical cells
6 battery modules
7 covering casing
8 outer surface
9 outer fireproof layers
10 inner layer
11 connector
12 through hole
13 patch
14 through hole
15 through cut
16 outer free edge
17 flaps
18 fixing means/metal press studs
19 hydraulic connector
20 stabilization wings
21 fixing means/metal press studs

The invention claimed is:

1. A power storage system (1) for an electric drive vehicle, the power storage system (1) comprises:
at least one battery pack (2), which is provided with a plurality of electrochemical cells (5), which are electrically connected to one another;
a container (3), which is provided, on the inside, with a chamber (4) housing the at least one battery pack (2);
at least one first connector (11), which is mounted on the container (3) and is designed to engage a second connector, from which a thread-like connection element originates; and
a covering casing (7), which is in direct contact with an outer surface (8) of the container (3), is made of a flexible fabric and is designed to thermally insulate and protect the container (3) from fire, since it is more fireproof than a material making up the container (3) and has a smaller thermal conductivity compared to the material making up the container (3); wherein the covering casing (7) has a first through hole (12), which is aligned with the first connector (11) and has an area which is equal to or greater than an area of the first connector (11) so as to allow access to the first connector (11) through the covering casing (7);
wherein the covering casing (7) comprises a patch (13), which is fixed to the rest of the covering casing (7) in a movable manner, is arranged in the area of the first through hole (12) so as to cover the first through hole (12) and has, on the inside, a second through hole (14), which has a smaller area than the first through hole (12) and is designed to be crossed by the thread-like connection element of the second connector without clearance;
wherein the patch (13) is movable relative to the covering casing (7) between a lifted position, in which the patch (13) is spaced apart from the rest of the covering casing (7) so as not to obstruct the first hole (12), and a protection position, in which the patch (13) rests against the rest of the covering casing (7) so as to partially close the first hole (12); and
wherein the patch (13) has at least one through cut (15), which originates from the second through hole (14) and reaches an outer free edge (16) of the patch (13) so as to assume an open configuration, in which the two flaps (17) of the cut (15) are spaced apart from one another and the patch (13) is designed to be crossed by the thread-like connection element in order to place the thread-like connection element inside the second through hole (14), and a closed configuration, in which the flaps (17) of the cut (15) partially overlap one another so as to close the cut (15) and delimit the second through hole (14) ensuring that the thread-like connection element adheres to an edge of the second through hole (14) without clearance.

2. The power storage system (1) according to claim 1, wherein the covering casing (7) reproduces the shape of the container (3) and is shaped so as to adhere to the container (3) without clearance.

3. The power storage system (1) according to claim 1, wherein the covering casing (7) comprises first fixing means (18), preferably metal press studs, to fix the patch (13) to the rest of the covering casing (7).

4. The power storage system (1) according to claim 3, wherein the first fixing means (18) consist of metal press studs.

5. The power storage system (1) according to claim 4, wherein each flap (17) of the patch (13) is provided with its own metal press stud, which is designed to fix the patch (13) to the rest of the covering casing (7).

6. A power storage system (1) according to claim 1 and comprising: a first electrical power connector (11), a second electrical signal connector, and a hydraulic connector (19) to allow a cooling fluid to circulate inside the container (3).

7. The power storage system (1) according to claim 1, wherein the covering casing (7) comprises:
- a plurality of stabilization wings (20), each resting on another part of the covering casing (7); and
- a plurality of second fixing means (21), preferably metal press studs, to fix each stabilization wing (20) to a corresponding part of the covering casing (7).

8. The power storage system (1) according to claim 1, wherein the fireproof fabric comprises:
- two outer fireproof layers (9) made of nonwoven fabric, preferably reinforced with glass fibers; and
- an inner layer (10), which is interposed between the two outer fireproof layers (9), is made of a fibrous fabric, preferably reinforced with glass fibers, and is designed to provide a greater thermal insulation than the two outer fireproof layers (9).

\* \* \* \* \*